United States Patent [19]

Kühne et al.

[11] 4,341,892
[45] Jul. 27, 1982

[54] PREPARATION OF ALKALI CELLULOSE HAVING A LOW WATER CONTENT

[75] Inventors: Norbert Kühne, Haan; Hasso Leischner; Wilfried Rähse, both of Düsseldorf; Willi Wüst, Ratingen-Hösel, all of Fed. Rep. of Germany

[73] Assignee: Henkel Kommanditgesellschaft auf Aktien, Düsseldorf-Holthausen, Fed. Rep. of Germany

[21] Appl. No.: 243,502

[22] Filed: Mar. 13, 1981

[30] Foreign Application Priority Data

Mar. 19, 1980 [DE] Fed. Rep. of Germany ....... 3010464

[51] Int. Cl.³ .............................................. C08B 1/08
[52] U.S. Cl. .................................................... 536/101
[58] Field of Search ........................................ 536/101

[56] References Cited

U.S. PATENT DOCUMENTS 2,680,737 6/1954 Grassie et al. ..................... 536/101
2,680,738 6/1954 Laughlin ............................ 536/101
2,767,170 10/1956 Graybeal et al. .................. 536/101

FOREIGN PATENT DOCUMENTS 250478 10/1962 Australia ............................. 536/101
546634 9/1957 Canada ................................ 536/101
1468226 12/1968 Fed. Rep. of Germany ...... 536/101
52854 3/1921 Sweden .............................. 536/101
543301 2/1942 United Kingdom ................ 536/101
611081 10/1948 United Kingdom ................ 536/101

Primary Examiner—Ronald W. Griffin
Attorney, Agent, or Firm—Hammond & Littel, Weissenberger and Muserlian

[57] ABSTRACT

This invention is directed to the preparation of alkali cellulose. More particularly, this invention is directed to a process for the preparation of alkali cellulose having a low water content, wherein finely divided cellulose suspended in a typical inert organic solvent is presteeped and the cellulose suspension is contacted with an alkali metal hydroxide/alcohol mixture and at least one aqueous alkalization solution of different concentration.

14 Claims, No Drawings

PREPARATION OF ALKALI CELLULOSE HAVING A LOW WATER CONTENT

FIELD OF THE INVENTION

This invention is directed to the preparation of alkali cellulose. More particularly, this invention is directed to the preparation of an especially reactive alkali cellulose which can be converted into high quality cellulose ethers with known etherification agents.

BACKGROUND OF THE INVENTION

It is known from various studies that the relative degree of conversion of alkali cellulose with etherification agents increases as the molar ratio of sodium hydroxide solution to cellulose ($\mu_o$) is reduced. The molar amount of etherification agent which reacts with the alkali cellulose in the desired manner, based on the total molar amount of etherification agent, is hereafter referred to as the selectivity. The selectivity decreases with the increase in the molar ratio of sodium hydroxide to cellulose, from approximately 85 percent at a $\mu_o$ of 1.5 to approximately 35 to 45 percent at $\mu_o$-values of 4, according to measurements made. The figures mentioned for the selectivity apply to the use of ethylene oxide as well as to the use of methyl chloride. Other known etherification agents produce substantially the same results. The strong decrease in selectivity can be explained by the increased amount of water that is added during the alkalization reaction with 50 percent hydroxide solution. Undesirable secondary reactions are thereby increased.

In the technically wide-spread dipping alkalization of cellulose sheets and boards the relationship between selectivity and $\mu_o$ is taken into account by the degree of pressing out and by the dipping in of sodium hydroxide solutions of different concentrations (from 20 to 45 percent). In the preparation of relatively highly substituted cellulose ethers, the alkalization must be carried out with from 35 to 45 percent sodium hydroxide solution.

The preparation of alkali cellulose from fibrous crumblike as well as from powdered cellulose may take place in double shaft extruders [German Published Applications (DE-AS) Nos. 15 43 114 and 15 43 136] with from 16 to 48 percent sodium hydroxide solution, or in a closed compulsory mixer equipped with a fast mixing mechanism, by spraying a 50 percent sodium hydroxide solution [German Published Application (DE-AS) No. 26 35 403]. These methods also result in a disproportionately great loss of etherification agent due to secondary reactions during the preparation of highly substituted mixed cellulose ethers. The preparation of a mixture of powdered cellulose and caustic soda in a mill is also known [German Published Application (DE-OS) No. 14 68 226].

OBJECTS OF THE INVENTION

It is an object of the present invention to provide a process for preparing alkali cellulose that allows a practically quantitative alkalization.

It is also an object of the invention to achieve a high degree of substitution with low molar ratios.

It is a further object of the invention to provide highly substituted cellulose ethers that can be produced simply and with relatively small amounts of starting material.

It is a yet further object of the invention to provide a reproducible, high quality product.

These and other objects of the invention will become more apparent in the discussion below.

DETAILED DESCRIPTION OF THE INVENTION

Applicants have found a method of preparing alkali cellulose which meets the objectives discussed above. According to the invention, alkali cellulose with a low water content is prepared by presteeping finely-divided cellulose with the aid of a typical organic solvent and by preforming the alkalization reaction with an alkali metal hydroxide/alcohol mixture and at least one aqueous alkaline solution of different concentration.

Applicant's discovery must be considered surprising since the addition of highly concentrated alkaline solutions normally results in cellulose ethers of poor quality. A uniform and intensive alkalization, which is an unalterable prerequisite for good products, could not be achieved thus far with these high alkali concentrations. Hence, in an unforeseeable way, this preparation of a high quality alkali cellulose was possible from more concentrated alkaline solutions, provided that powdered or wooly/powdery cellulose presteeped in an alkali metal hydroxide/alcohol mixture is used, and that the alkalization is carried out with an aqueous alkaline solution of high concentration.

A commercial cellulose reduced to small pieces, that is, finely divided, is used for the process according to the invention. Powdered cellulose with a mean grain diameter of from about 20 to 120$\mu$, preferably from about 40 to 100$\mu$, is especially suitable. The most varied types of cellulose can be used, that is, powdered as well as largely fibrous beech or spruce cellulose can be used. The use of a fibrous linters quality is also possible.

The two-step alkalization reaction in suspension that takes place with the presteeped cellulose is essential for the process according to the invention. Advantageously the process corresponds to the following description:

In the first step, part of the alkalization agent, in the form of pulverized caustic soda or sodium hydroxide hydrate, is added to the cellulose powder suspension in a typical inert organic solvent, such as, for example, toluene, cyclohexane, xylene, octane, or decane, at room temperature. Then, an organic liquid capable of solubilizing caustic soda, such as, for example, an alcohol, preferably a lower alkanol such as, methanol, isopropanol, or butanol, or ethylene glycol, is pumped in in amounts of from about 5 to 150 percent by weight, based on the weight of the cellulose, for the presteeping. The amount of alcohol added depends on the type and degree of particle size distribution of the cellulose and can be ascertained readily by preliminary manual tests.

It is also possible to use the organic liquid capable of solubilizing caustic in excess as the suspending agent, particularly isopropanol.

An addition of 15 percent by weight of methanol, for example, is adequate for a finely pulverized KFHS-spruce cellulose (100%<100$\mu$), whereas from about 100 to 120 percent by weight may be required for wooly linters. After the presteeping, which is substantially complete after from about 2 to 15 minutes, the remaining amount of alkalization agent is added in the form of from about 40 to 60 percent by weight of aqueous sodium hydroxide solution. Then, the alkalization reaction takes place at a temperature of from about 20° to 120° C., preferably from about 45° to 80° C., within a few minutes to approximately one-half hour, that is, within from about 5 to 30 minutes.

Exchange processes take place during the alkalization reaction with the participation of the steeping agent and the water that is present, which result in uniform and even alkalization.

The solid alkali metal hydroxide added, preferably sodium hydroxide, dissolves during the alkalization and becomes attached to the cellulose. After the alkalization, a uniform, highly active alkali cellulose that also has a low water content is obtained, which can easily be converted into cellulose ether by known methods.

In a preferred embodiment of the invention, first a from about 65 to 100 percent sodium hydroxide solution and then a from about 15 to 60 percent aqueous sodium hydroxide solution are used as alkalization agents.

The cellulose ethers prepared from the alkali cellulose produced according to the invention possess high degrees of substitution due to the increased selectivity for the respective molar ratios of the starting materials. A decrease in the other quality characteristics of the products cannot be observed. The cellulose ethers form clear solutions. Because of the increased selectivity, the products can be prepared with smaller quantities of etherification agents.

The molar ratio of solid, anhydrous alkali metal hydroxide to dissolved alkali metal hydroxide is of crucial significance for the quality of the product. This ratio should be in the range from 0 to about 3.5:1, preferably from about 0.2 to 1.0:1.

The alkali cellulose prepared as described above is then alkylated by a known method, discontinuous as well as continuous methods being suitable for this purpose. Various steps for the further processing of the alkali cellulose are available. The alkali cellulose itself, or also a previously pre-alkylated form, can be alkylated with methyl chloride and/or ethylene oxide and/or propylene oxide. Furthermore, the alkali cellulose prepared according to the invention itself, or the prealkylated form, can be further reacted with chloroacetic acid or its alkali metal salts. The reaction of the alkali cellulose obtainable according to the invention with other known reagents causing alkylation is also possible.

A characteristic of the invention is that optimal alkalization is achieved even with substoichiometric amounts of sodium hydroxide. The $\mu_o$-value, that is, the molar ratio of sodium hydroxide to anhydroglucose unit, is 3 for a stoichiometric starting mixture. Alaklization that permits the preparation of good products can be obtained with $\mu_o$-values as low as 1.5. It was unexpectedly found that the substitution yield, that is, selectivity, rises quickly as the molar ratio of sodium hydroxide to anhydroglucose unit is decreased. While the selectivity in the known methods is approximately 40 to 50 percent, it can be raised to values exceeding 80 percent in the process according to the invention by adjusting to the optimally determined conditions. It is especially important to note that these values are reached for methyl chloride as well as for alkylene oxides. An excess is largely unnecessary in the reaction with methyl chloride when the alkali cellulose prepared according to the invention is used.

The superiority of the products that were synthesized from the alkali cellulose prepared according to the invention is apparent, for example, from the fact that even low substituted methyl celluloses, which otherwise dissolve only in alkalies, are readily soluble in water. This fact permits the assumption of a very uniform substitution, which is possible only through completely homogeneous alkalization of the cellulose. Furthermore, the celluloses alkalized in this way can be turned into mixed ethers simultaneously and very easily, resulting in products with interesting solubility characteristics.

The adjustment of the viscosity is especially simple in the method above. According to the invention, the degassing time is reduced with a minor decrease of the viscosity. A further decrease is characterized by the absence of degassing and by an additional thermal degradation of the alkali cellulose. The viscosity can be adjusted in the range from 20 to about 60,000 mPa.s by the choice of times, temperatures, and the quality of the cellulose.

The following examples are intended to illustrate the invention and are not to be construed as limiting the invention thereto.

EXAMPLES

Example 1

Eighty kilograms of powdered spruce cellulose with a mean particle diameter of approximately 50$\mu$ were suspended in 950 liters of toluene, with agitation, at room temperature. After the addition of 26 kg of caustic soda, the suspension was first degassed by boiling under vacuum at approximately 100 torr and 30° C. and then presteeped with 15 kg of methanol. Then, 106 kg of 50 percent sodium hydroxide solution were added to the suspension. The alkalization reaction was completed by a conversion lasting one-half hour at 70° C. Subsequently, the methanol was removed completely and the water was removed partly, by azeotropic distillation.

The suspension of alkali cellulose in toluene obtained by this method was etherified by the addition of 120 kg of methyl chloride (20% excess) and 9.7 kg of propylene oxide. The reaction took place in a known manner, at 60° to 120° C. within 100 minutes with a temperature program. The methylhydroxypropyl cellulose had the following product characteristics after purification:

| | |
|---|---|
| Viscosity (2% solution, Brookfield): | 18,000 mPa.s |
| Turbidity number: | 5 |
| Degree of substitution | |
| Methoxyl: | 1.98 |
| Hydroxypropyl: | 0.12 |
| Selectivities δ | |
| Methoxyl: | 50% |
| Hydroxypropyl: | 34% |

Comparison Example 1

The procedure of Example 1 was repeated with the exception that the alkalization reaction was performed with 158 kg of 50 percent sodium hydroxide solution, rather than with a mixture of caustic soda/methanol and 50 percent sodium hydroxide solution. After etherification under otherwise identical conditions, a product was obtained that after purification had the following analytical data at practically the same viscosity of the aqueous solution:

| | |
|---|---|
| Turbidity number: | 7 |
| Degree of substitution | |
| Methoxyl: | 1.68 |
| Hydroxypropyl: | 0.09 |

| Selectivities δ | |
|---|---|
| Methoxyl: | 42% |
| Hydroxypropyl: | 26% |

EXAMPLE 2

Eighty kilograms of wooly/powdered spruce cellulose with a particle diameter of approximately 20 to 500μ was suspended in 950 liters of toluene, with agitation, at room temperature. After addition of 12 kg of caustic soda, presteeping took place with 15 kg methanol. After presteeping, 75 kg of 50 percent sodium hydroxide solution were added to the suspension. The alkalization reaction was completed by a conversion lasting one-half hour at 65° C. Subsequently, the methanol was removed completely and the water was removed partly, by azeotropic distillation.

The suspension of alkali cellulose obtained by this method was converted after addition of 75 kg of methyl chloride (20% excess) and 8.7 kg of ethylene oxide. The reaction took place in a known manner within approximately 100 minutes at 60° to 120° C., according to a temperature program. The methylhydroxyethyl cellulose had the following product characteristics after purification.

| Viscosity (2% solution, Brookfield): | 230 mPa.s |
|---|---|
| Turbidity number: | 12 |
| Degree of substitution | |
| Methoxyl: | 1.61 |
| Hydroxyethyl: | 0.26 |
| Selectivities δ | |
| Methoxyl: | 64% |
| Hydroxyethyl: | 65% |

Comparison Example 2

The procedure of Example 2 was repeated with the exception that the alkalization reaction was performed with 99 kg of 50 percent sodium hydroxide solution, rather than with a mixture of caustic soda/methanol and 50 percent sodium hydroxide solution. After etherification under otherwise identical conditions, a product was obtained that after purification had the following analytical data at practically the same viscosity (270 mPa.s):

| Turbidity number: | 11 |
|---|---|
| Degree of substitution | |
| Methoxyl: | 1.55 |
| Hydroxyethyl: | 0.23 |
| Selectivities δ | |
| Methoxyl: | 62% |
| Hydroxyethyl: | 58% |

Example 3

Eighty kilograms of powdered beech cellulose with a mean particle diameter of approximately 50μ were suspended in 800 kg of isopropanol (85%) and then 7.7 kg of caustic soda were added with agitation. Addition of 36 kg of 50 percent sodium hydroxide was made after 10 minutes. The alkalization reaction was completed with a subsequent conversion at 65° C. that lasted one-half hour.

The suspension of alkali cellulose in isopropanol/water obtained in this manner was then mixed with 56 kg of sodium monochloroacetate. The reaction was completed in the known manner with a temperature program between 40° and 100° C. The molar ratio for the reaction of cellulose with sodium hydroxide solution and sodium monochloroacetate was 1:1.3:1.2.

The product was worked up and purified in a known manner by washing with 75 percent isopropanol. After the salt was removed by washing, the product had the following quality characteristics:

| Viscosity: | 3,200 mPa.s |
|---|---|
| Turbidity: | 4 |
| (3.5 cm layer thickness) | |
| Degree of substitution: | 0.97 |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the preparation of alkali cellulose having a low water content, wherein finely divided cellulose suspended in an inert organic solvent is presteeped with an alkali metal hydroxide and optionally an alcohol and the presteeped suspension is contacted with an aqueous alkali metal hydroxide alkalization solution of different concentration.

2. The process of claim 1, wherein cellulose of beech, spruce or linters is used.

3. The process of claim 2, wherein the cellulose is short-fibered or powdered.

4. The process of claim 1, wherein the alcohol is a lower aliphatic alcohol with from 1 to 4 carbon atoms.

5. The process of claim 4, wherein the alcohol is methanol.

6. The process of claim 1, wherein first a from about 65 to 100 percent sodium hydroxide solution and then a from about 15 to 60 percent aqueous sodium hydroxide solution are used as alkalization agents.

7. The process of claim 1, wherein the inert organic solvent is an aliphatic hydrocarbon having from 6 to 12 carbon atoms.

8. The process of claim 7, wherein the inert organic solvent is toluene, cyclohexane, xylene, octane, or decane.

9. The process of claim 1, wherein during the presteeping stage solid alkali metal hydroxide is added to the cellulose suspension.

10. The process of claim 9, wherein the molar ratio of solid alkali metal hydroxide to alkali metal hydroxide in aqueous solution is from about 0.01 to 3.5:1.

11. The process of claim 10, wherein the molar ratio is from about 0.2 to 1.2:1.

12. The process of claim 10, wherein the alkali metal hydroxide in each instance is sodium hydroxide.

13. The process for the preparation of alkali cellulose having a low water content according to claim 1, wherein a suspension of finely divided cellulose in an inert organic solvent to which solid sodium hydroxide and then optionally an alcohol have been added, is presteeped, and the presteeped suspension is contacted with an aqueous sodium hydroxide solution of different concentration.

14. The process of claim 13, wherein the solid sodium hydroxide and the alcohol comprise a from about 65 to 100 percent by weight sodium hydroxide solution and the aqueous sodium hydroxide solution comprises from about 15 to 60 percent by weight of sodium hydroxide.

* * * * *